3,298,803
COMPOSITE METAL ARTICLE OF STAINLESS STEEL AND COPPER

John B. Ulam, McMurray, Pa., assignor to Composite Metal Products, Inc., a corporation of Pennsylvania
No Drawing. Filed Mar. 15, 1965, Ser. No. 439,985
7 Claims. (Cl. 29—196.3)

This invention relates to composite metal articles and members and particularly to the bonding of stainless steel to copper and to a stainless steel-copper composite article.

In the manufacture of heat transfer articles and members, such as cooking vessels, stainless steel is an ideal surface material. It is resistant to corrosion, may be readily polished and cleaned to a bright attractive surface and is resistant to destruction from heat and oxygen. Stainless steel is, however, subject to the disadvantage of localized heating so that hot spots develop resulting in burning or overheating of food or like materials in the area of the hot spot. In order to overcome this disadvantage it has been proposed to bond sheets of stainless steel to the outer surfaces of an inner core of copper to obtain an article which has the desirable surface characteristic of stainless steel but without the disadvantage of localized overheating. The most desirable and practical method of forming such composite articles or members is to join sheets of stainless steel onto a sheet of copper and roll them to a finished composite sheet from which the article, such as a cooking pan, may be formed by deep drawing.

By such a method it is possible to clad the copper or copper alloy on both sides so that copper or copper alloy is not exposed to heat and air and the superior oxidation and corrosion resistance properties of the stainless steel may be employed on both the inside and outside surface of the utensil. In addition, whether or not one surface of the copper is to be exposed or the clad stainless steel is to be placed on both sides of the copper, far more effective and economical manufacturing means may be employed by rolling a composite stainless steel-copper structure to final gauge and deep drawing than by bonding copper or copper allow to the ouside surface of the finished product.

When stainless steel is bonded to copper either on one side or on both, and the structure is subsequently cold worked, such as by cold rolling or deep drawing, it must be annealed to remove the internal stresses imposed by such cold working. It may be necessary to make several draws on a given utensil to effect the final desired shape, and the part must be annealed between each drawing operation. After annealing at a sufficiently high temperature to relieve the stress build-up in the stainless steel (temperatures of at least 1300° F.), it is found that the subsequently cold worked material exhibits a surface condition appearing as a pebbling effect which can be described as similar to the surface of an orange peel or alligator skin. This condition is that which is commonly referred to in the metallurgical field as "orange peel effect." Although an orange peel effect may be controlled to some extent by heat treatment and surface finishing after cold mechanical reduction of the composite material, the phenomenon has greatly retarded the use of such techniques in the manufacture of cooking utensiles from composite stainless steel and copper.

In my Patent 3,050,834 issued August 28, 1962, I disclose the fact that be employing a copper alloy containing chromium within certain limits, this orange peel effect may be eliminated. This practice has the drawback that chromium tends to oxidize and the resultant chromium oxides are very difficult to put into solution. This results in undesirably increased costs.

I have now discovered that by adding zirconium or boron, alone or together or in admixture with chromium I can overcome this problem of chromium oxide solubility and produce a copper stainless steel composite that is free of orange peel effect. I have discovered that zirconium and boron alloy readily with copper and provide equally effective elimination of the orange peel effect but without the formation of deleterious oxides characteristic of chrominum.

I have found that any grade of stainless, austenitic, ferritic, or martensitic may be used as the cladding.

I have further discovered that the thermal conductivity of the copper core can be increased by heating the finished clad metal to a temperature between 750° and 1000° F. for a period of 15 to 30 minutes. I have found that a copper core can be increased in thermal conductivity from 64% of that of pure copper to 97% of that of pure copper by the simple expedient of this heat treatment.

In general, the present invention relates to the discovery that by employing a deoxidized copper alloy containing zirconium or boron or both within the range of from about .01% to about .85%, a copper-stainless steel clad structure may be fabricated into finished and drawn products by alternating annealing and cold working without effecting the usual adverse surface condition known as orange peel.

It is thought that the surface condition known as orange peel in the finished drawn part is the result of telegraphing large copper grains through the layers of stainless steel whether it be a single or double armor clad product. Due to the pressing or compressing action of all the known methods of drawing, no matter how slight, the large grain size of copper or copper alloys results in the pebbling effect. Prior known methods of reducing these grains have failed to eliminate the condition. The large grains of the copper alloy are primarily due to the heat treatment that is necessary to relieve the stainless steel of stresses imposed by cold reduction. The stress in copper is released at a much lower temperature than that of the stainless steel, and when a temperature sufficiently high to recrystallize and soften the stainless is reached excessive grain growth takes place in the copper. Thus, the composite structure is one of fine grained stainles steel and large grained copper which inherently results in the orange peel effect. The minimum temperature for annealing the stainless steel clad is about 1300° F.; however, best results are obtained at much higher temperatures of from about 1450° F. to 1750° F. The boron or zirconium addition to copper is believed to result in a second phase occurring in the copper matrix that inhibits the grain growth of the metal by mechanical obstruction. It has been determined that the ideal grain size for the copper alloy subsequent to annealing and prior to cold deformation is an average grain size of from about .025 mm. to .045 mm. diameter. The range of zirconium or boron required to maintain such a grain size has been found to be from about .01% to .85%. Also, it has been found that to retain ductility and heat transfer of properties in the copper one should not exceed about .85% zirconium or boron or both in combination. On the other hand, less than about .01% and preferably .03% zirconium or boron is not effective in retaining a fine grain copper structure while annealing at temperatures about 1300° F. so as to avoid the surface condition above mentioned.

A basic requirement of the copper alloy to be employed is that it be thoroughly deoxidized in order that the oxide combination does not build up at the bonding surface between the copper and the stainless steel and that the copper alloy possess the adequate and desired mechanical properties to sustain the drawing. Deoxidation is commonly effected by additions of phosphorus to the copper during its manufacture, usually within a range of from .01% to .04%. However, other additions, such as lithium, may be equally effective. Also, other additions to the copper alloy which do not interfere with the grain growth inhibiting properties of the chromium, zirconium or boron may be made. For example, additions of zinc, lead, tin, iron, manganese, aluminum, nickel and silicon may be desirable to impart specific properties to the copper alloy.

The stainless steel employed as cladding in the articles of the present invention may be any stainless steel containing from about 10% to 35% chromium; however, ferritic or martensitic stainless steels do not lend themselves to cold working, such as deep drawing, and therefore the problems of orange peel and surface defects do not arise in the ordinary use of these materials and the occasion to employ such materials as cladding seldom arises. However in those cases where it seems expedient to use them as cladding stainless, this invention is effective. On the other hand, any of the stainless steels which exhibit an austenitic structure may be employed for deep drawing. Such materials commonly contain from about 12% to 25% chromium and from about 5% to 25% nickel. Typical examples of such steels are AISI types 301, 302, 304 and 305. Other austenitic steels include those commonly referred to as the 200 series or those that possess an austenitic structure primarily due to their manganese, manganese plus nickel, carbon and nitrogen contents. Such steels may contain from about 12% to 25% chromium and up to 25% manganese. They generally contain some nickel and may contain nitrogen (up to about .50%). Any of the austenitic stainless steel compositions may contain up to about .2% carbon; however, the deep drawing grades will usually contain less than .1%. All such steels will contain about .040% maximum residual phosphorus and sulfur. Other additions for specific purposes may be added to the austenitic stainless steel composition, such as small but effective amounts of copper, molybdenum, columbium, tantalum, titanium, zirconium, tungsten, vanadium, boron, etc.

In utilizing the copper alloys of the prior art practice, the method of forming the copper alloy-stainless steel clad structure is incidental in that orange peel effect will occur on cold working or deep drawing regardless of the method employed in bonding the copper alloy to the stainless steel. Thus, as the stainless steel is bonded to the copper or clad on either side of the copper in such a manner as to effect a finished sheet ready for deep drawing, orange peel effect may be observed after drawing, annealing and finished drawing. On the other hand, orange peel effect is even more certain to occur where the stainless steel and copper are bonded before or during hot working or hot rolling and subsequent cold rolling to clad sheet product preparatory to subsequent deep drawing. According to this invention, it is necessary to employ copper that contains zirconium or boron within the designated range regardless of what method of cladding is to be employed. We have found that where stainless is to be clad on either side of the copper alloy, a convenient method is to form a sandwich-type structure, evacuate the structure and subsequently hot roll and cold roll to a finished sheet product. It is recommended that the roll bonding method, such as disclosed by Patent No. 2,758,368 calling for the mechanical cleaning of the intended bonding surfaces and the sealing of the componets to form a composite structure which is then evacuated and/or heated in an inert atmosphere prior to rolling, be utilized. Making of this metal composition can be accomplished by continuous rolling of coils, such as disclosed in the above-mentioned Patent 2,758,368, whereby the metal strands are brought into intimate contact after mechanically cleaning their surfaces intended for bonding, heating in an inert atmosphere or vacuum and applying pressure thereto. Billets or assemblies can be made by casting of the copper alloy onto stainless steel or inside two layers of stainless steel, thus resulting in a composite assembly with an as-cast structure. In using the above casting method, it is vitally important that the casting and heating of the outside claddings be done in an inert atmosphere or vacuum. The preferred manner of practicing the invention is utilization of the Ulam Patent No. 2,758,368, producing the metal combination 2,758,368, producing the metal combination in assemblies in asemblies or strip, but any of the above-described methods can be used.

Micro examination of deep drawn stainless steel-copper alloy clad articles have shown that the desired copper grain size is from about .025 millimeter diameter to about .045 millimeter diameter. During cold working, the average diameter of copper alloy grain may well exceed .045 millimeter; however, if the zirconium or boron content of the copper alloy is within the range of from about .01% to .85% upon annealing with the temperature range of from about 1450° F. to 1700° F., recrystallization will effect a grain size of from between .025 millimeter to .045 millimeter.

Although the phenomena of orange peel effect is most pronounced on flat rolled composite products such as sheet and strip, it may occur on other composite stainless steel-copper products. For example, where stainless steel and copper are co-extruded to form composite copper-stainless steel tubes for use in heat exchangers, orange peel effect may adversely affect the surface of such a tube. Composite stainless-steel copper tubes may also be employed in the aircraft industry where a smooth surface is required. The use of a deoxidized copper containing from .01% to .85% zirconium or boron, as shown by the present invention, eliminates the uneven surfaces that may be experienced in composite articles manufactured in this manner.

The following specific examples are given to illustrate the articles of the present invention and in no way limit the invention or the claims to the exact embodiments set forth.

Copper base alloys were clad with AISI type 302 stainless steel in the manner described in my patent 3,050,834. Compacts consisting of copper alloy cores, stainless steel cladding and side bars were welded together to form compacts of the following specifications:

TABLE I
[Core composition (percent)]

| Example | Clad | Additive | P | Cu |
|---|---|---|---|---|
| 1 | Type 302 | 0.125 Zr + 0.125 Cr | 0.02 | 99.73 |
| 2 | do | 0.11 Zr | 0.023 | 99.86 |
| 3 | do | 0.185 B + 0.185 Cr | 0.03 | 99.60 |
| 4 | do | 0.09 Zr + 0.09 B | 0.05 | 99.77 |
| 5 | do | 0.15 Zr | 0.035 | 99.81 |
| 6 | do | 0.035 Zr + 0.035 Cr | 0.04 | 99.89 |
| 7 | do | 0.03 Cr | 0.02 | 99.95 |
| 8 | do | 0.3 Zr + 0.3 Cr + 0.2 B | 0.03 | 99.17 |
| 9 | do | 0.3 B | | 99.70 |

Four samples from each example of the hot rolled material of Table I were removed and annealed for the times and at the temperatures set out in Table II and the copper grain size and percent elongation were determined as set out in Table II.

TABLE II

|   | Anneal | | Copper Grain Size, mm. | Percent Elongation |
|---|---|---|---|---|
|   | Time, min. | Temp., °F. | | |
| 1 | 15.0 | 1,250 | .025 | 27 |
| 1 | 10.0 | 1,400 | .025 | 41 |
| 1 | 7.5 | 1,550 | .035 | 44 |
| 1 | 5.0 | 1,675 | .045/.090 | 48 |
| 2 | 15.0 | 1,250 | .025 | 22 |
| 2 | 10.0 | 1,400 | .025 | 38 |
| 2 | 7.5 | 1,550 | .045 | 43 |
| 2 | 5.0 | 1,675 | .045/.200 | 47 |
| 3 | 15.0 | 1,250 | .025 | 23 |
| 3 | 10.0 | 1,400 | .025 | 43 |
| 3 | 7.5 | 1,550 | .035 | 47 |
| 3 | 5.0 | 1,675 | .035/.060 | 50 |
| 4 | 15.0 | 1,250 | .025 | 22 |
| 4 | 10.0 | 1,400 | .025 | 43 |
| 4 | 7.5 | 1,550 | .035 | 45 |
| 4 | 5.0 | 1,675 | .045/.120 | 48 |
| 5 | 15.0 | 1,250 | .025 | 20 |
| 5 | 10.0 | 1,400 | .035 | 41 |
| 5 | 7.5 | 1,550 | .045 | 44 |
| 5 | 5.0 | 1,675 | .045/.120 | 48 |
| 6 | 15.0 | 1,250 | .035 | 20 |
| 6 | 10.0 | 1,400 | .035 | 40 |
| 6 | 7.5 | 1,550 | .045 | 42 |
| 6 | 5.0 | 1,675 | .090/.200 | 46 |
| 7 | 15.0 | 1,250 | .035 | 21 |
| 7 | 10.0 | 1,400 | .035 | 41 |
| 7 | 7.5 | 1,550 | .045 | 44 |
| 7 | 5.0 | 1,675 | .090/.200 | 47 |
| 8 | 15.0 | 1,250 | .025 | 23 |
| 8 | 10.0 | 1,400 | .025 | 43 |
| 8 | 7.5 | 1,550 | .025 | 47 |
| 8 | 5.0 | 1,675 | .025 | 49 |
| 9 | 15.0 | 1,250 | .025 | 21 |
| 9 | 10.0 | 1,400 | .025 | 44 |
| 9 | 7.5 | 1,550 | .035/.045 | 46 |
| 9 | 5.0 | 1,675 | .045 | 50 |

It will be observed that the addition of zirconium alone or together with boron and/or chromium and boron with chromium and/or zirconium will produce results comparable to those of chromium alone in control of copper grain size. However the addition of zirconium or boron alone or with each other or with chromium eliminates the problem of chromium oxide formation or chromium copper oxide formation characteristic of chromium used alone. These additives also restrain grain growth in the temperature range where end clad metal can be annealed, thus making a useful and acceptable product.

While I have illustrated and described certain preferred compositions and practices of my invention in the foregoing specification it will be understood that this invention may be otherwise embodied within the scope of the following claims.

I claim:
1. A composite metallic article comprising at least one layer of stainless steel bonded on one face to one face of at least one layer of a copper base alloy that consists essentially of from 0.01% to 0.85% of one or more members selected from the group consisting of zirconium and boron, balance copper.

2. A composite metallic article as claimed in claim 1 which has been heat treated after working to a temperature of 750° F. to 1000° F. for a period of 15 to 30 minutes.

3. A composite metallic article comprising at least one layer of stainless steel bonded on one face to one face of at least one layer of a copper base alloy that consists essentially of from 0.10% to 0.85% of one or more members selected from the group consisting of zirconium and boron, balance copper with an amount of chromium not exceeding one half of the amount of said group member present.

4. A composite metallic article comprising at least one layer of stainless steel bonded on one face to one face of at least one layer of a copper base alloy that consists essentially of 0.01% to 0.85% zirconium, balance copper.

5. A composite metallic article as claimed in claim 4 which has been heat treated after working to a temperature of 750° F. to 1000° F. for a period of 15 to 30 minutes.

6. A composite metallic article as claimed in claim 4 containing about 0.01% to 0.04% phosphorus.

7. A composite metallic article comprising at least one layer of stainless steel bonded on one face to one face of at least one layer of a copper base alloy that consists essentially of 0.01% to 0.85% boron, balance copper.

References Cited by the Examiner
UNITED STATES PATENTS

| 2,941,289 | 6/1960 | Chace | 29—196.3 |
| 3,050,834 | 8/1962 | Ulam | 29—196.3 |
| 3,251,660 | 5/1966 | Finsterwalder | 29—196.3 |

HYLAND BIZOT, *Primary Examiner.*